(12) United States Patent
Gill et al.

(10) Patent No.: US 8,407,331 B2
(45) Date of Patent: Mar. 26, 2013

(54) CODELESS PROVISIONING

(75) Inventors: Jasjeet Gill, Seattle, WA (US); Nima Ganjeh, Redmond, WA (US); Björn Gustaf Andreas Kjellman, Bellevue, WA (US); Hiu Yu Lo, Redmond, WA (US); Bruce P. Bequette, Lynnwood, WA (US); Robert D. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1232 days.

(21) Appl. No.: 12/120,138

(22) Filed: May 13, 2008

(65) Prior Publication Data

US 2009/0222834 A1 Sep. 3, 2009

Related U.S. Application Data

(60) Provisional application No. 61/032,389, filed on Feb. 28, 2008.

(51) Int. Cl.
*G06F 15/173* (2006.01)
(52) U.S. Cl. ......... 709/223; 709/225; 709/245; 707/611
(58) Field of Classification Search .................. 709/223, 709/225, 245; 707/611
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 7,124,203 | B2 | 10/2006 | Joshi et al. | |
| 7,181,472 | B2 | 2/2007 | Cameron et al. | |
| 7,216,163 | B2 | 5/2007 | Sinn | |
| 7,240,073 | B2 * | 7/2007 | Benson et al. | 707/610 |
| 7,302,446 | B1 | 11/2007 | Boothby | |
| 7,822,707 | B1 | 10/2010 | Yehuda et al. | |
| 8,099,509 | B2 * | 1/2012 | Kawato | 709/229 |
| 2002/0138763 | A1 | 9/2002 | Delany et al. | |
| 2003/0236820 | A1 | 12/2003 | Tierney et al. | |
| 2004/0225674 | A1 | 11/2004 | Benson et al. | |
| 2005/0071687 | A1 | 3/2005 | Pathakis et al. | |
| 2006/0005198 | A1 | 1/2006 | Uchishiba et al. | |
| 2006/0015539 | A1 | 1/2006 | Wolf et al. | |

(Continued)

FOREIGN PATENT DOCUMENTS

CN 101101653 1/2008

OTHER PUBLICATIONS

Kang M. et al, "Access Control Mechanisms for Inter-Organizational Workflow", Proceedings of the Sixth ACM Symposium on Access Control Models and Technologies; [ACM Symposium on Access Control Models and Technologies. (Formerly ACM Workshops on Role-Based Access Control)], May 3, 2001, pp. 66-74.

(Continued)

*Primary Examiner* — David Lazaro
*Assistant Examiner* — Marie Georges Henry
(74) *Attorney, Agent, or Firm* — Workman Nydegger

(57) ABSTRACT

Managing resources. A resource manager includes programmatic code for managing resources in the computing environment. Resources available from resource systems within the computing environment are managed. Methods may include receiving user input indicating one or more of that a new entity should be added to the resource manager, that an entity represented by an entity object of the resource manager should have permissions removed at the resource manager, or that an entity represented by an entity object of the resource manager should have permissions added at the resource manager. In response to receiving user input, events may be generated and objects created or removed from the resource manager for from downstream resource systems. The events may specify workflows that should be executed to perform synchronization between objects at the resource manager and objects at a downstream resource system by adding or changing rules in an expected rules list.

20 Claims, 3 Drawing Sheets

U.S. PATENT DOCUMENTS

| | | | |
|---|---|---|---|
| 2006/0271600 | A1 | 11/2006 | Goh et al. |
| 2007/0067403 | A1* | 3/2007 | Holmes .......................... 709/206 |
| 2007/0100834 | A1 | 5/2007 | Landry et al. |
| 2007/0150480 | A1 | 6/2007 | Hwang et al. |
| 2007/0244932 | A1 | 10/2007 | Ahn et al. |

OTHER PUBLICATIONS

Huang Yan-Nong et al, "Policies in a resource manager of workflow systems: modeling, enforcement and management", Proceedings—International Conferences on Data Engineering 1999 Institute of Electrical and Electronics Engineers Computer Society, 1999, pp. 1-21.

Office Action dated Nov. 29, 2011 cited in U.S. Appl. No. 12/120,136.

Quest Software, "ActiveRoles Quick Connect 3.5", 2007 Quest Software, Inc., 20 pages.

Microsoft Identity Lifecycle Manager, "Microsoft Identity and Access Solutions", 2007, 2 pages.

Rooney, Paul, "Microsoft Readies Identity Integration Server SP2, 'Gmini' Upgrade", Jun. 2005, 4 pages.

Clercq, Jan De, "Passowrd Synchronization Microsoft solutions for secure access", From the Aug. 2007 Edition of Windows IT Pro, Aug. 2007, 3 pages.

Quest Software, Identity Management & Access Management Made Simple "Simplifying Identity Management", 2007, 2 pages.

Mass Media Distribution Newswire, "The Dot Net Factory Partners with Microsoft to Support Microsoft Identity Lifecycle Manager 2007", Jun. 2007, 2 pages.

Sun Java System Identity Management, "Delivering End-to-End Identity Management Services", 2005, 6 pages.

Microsoft Technet, "Planning Synchronization Rules for MIIS 2003", Jun. 2004, 14 pages.

Microsoft, "Microsoft Identity Lifecycle Manager 2007 FP1 Product Overview" Published Feb. 2007, Updated Jan. 2008, 4 pages.

Oracle, "Oracle Identity Manager Connector Framework Guide Release 9.0.3", Feb. 2007, 24 pages.

Quest Software, "Automated User Provisioning ActiveRoles Quick Connect: An Add-On Application for ActiveRoles Server", 2007, 3 pages.

U.S. Appl. No. 12/120,136, filed May 13, 2008, Gill.

Notice of Allowance dated May 8, 2012 cited in U.S. Appl. No. 12/120,136.

* cited by examiner

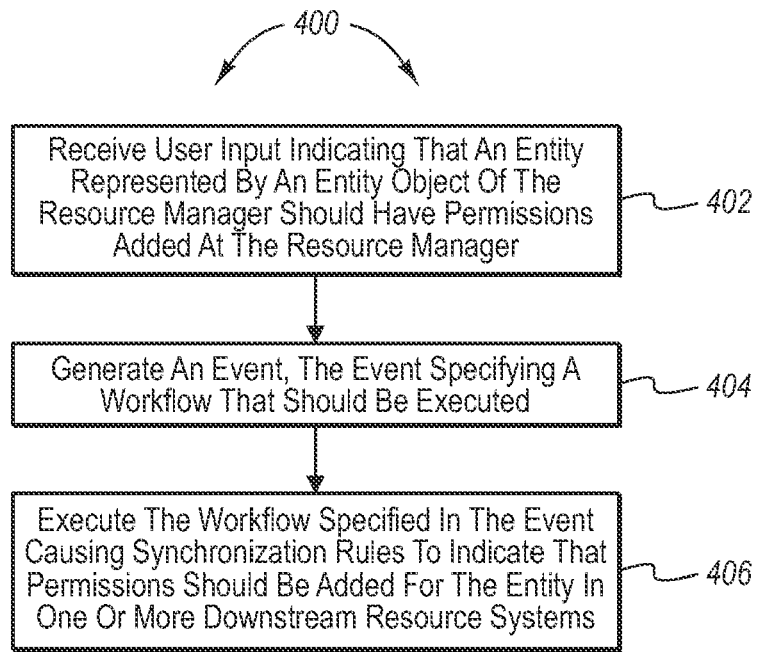

CODELESS PROVISIONING

CROSS-REFERENCE TO RELATED APPLICATIONS

This application claims the benefit of U.S. Provisional Application 61/032,389 titled "CODELESS PROVISIONING" filed on Feb. 28, 2008, which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

In many computing systems it is often desirable to grant permissions to entities working within the computing system to allow entities to access certain resources within the computing system. For example, when an individual is hired at a company it may be appropriate to assign the individual access to e-mail by creation of an e-mail account, access to certain databases by creation of database access accounts, or access to other resources.

Various resource manager systems have been created to manage entity permissions within a computing system. The resource manager systems communicate with other resource systems in the computing system to provide the other resource systems with instructions to add or remove permissions for entities. For example, Identity Lifecycle Manager® (ILM) provided by Microsoft® Corporation of Redmond Wash. provides the ability to manage entity permissions within a computing system. However, many such systems require that a programmer create imperative programming code that allows the resource manager system to communicate with the other resource systems to cause the systems to add the appropriate permissions for entities. This of course may add additional complexity and difficulty to resource management functionality.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments include functionality for managing resources in a computing environment. For example, embodiments may be practiced in a computing environment including a resource manager. The resource manager includes programmatic code for managing resources in the computing environment. Methods may include acts for managing resources available from resource systems within the computing environment, including managing permissions for entities to access the resources. Methods may include receiving user input indicating one or more of that a new entity should be added to the resource manager, that an entity represented by an entity object of the resource manager should have permissions removed at the resource manager, or that an entity represented by an entity object of the resource manager should have permissions added at the resource manager.

In response to receiving user input, events may be generated and objects created or removed from the resource manager for downstream resource systems. The events may specify workflows that should be executed to perform synchronization between objects at the resource manager and objects at a downstream resource system by adding or changing rules in an expected rules list. In response to the events, workflows are executed event causing synchronization rules to be added to or changed at the expected rules list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates a method of adding permissions to objects in downstream resource systems; and FIG. 5 illustrates a method of coordinating detected permissions with expected or desired permissions.

DETAILED DESCRIPTION

Figure 1:
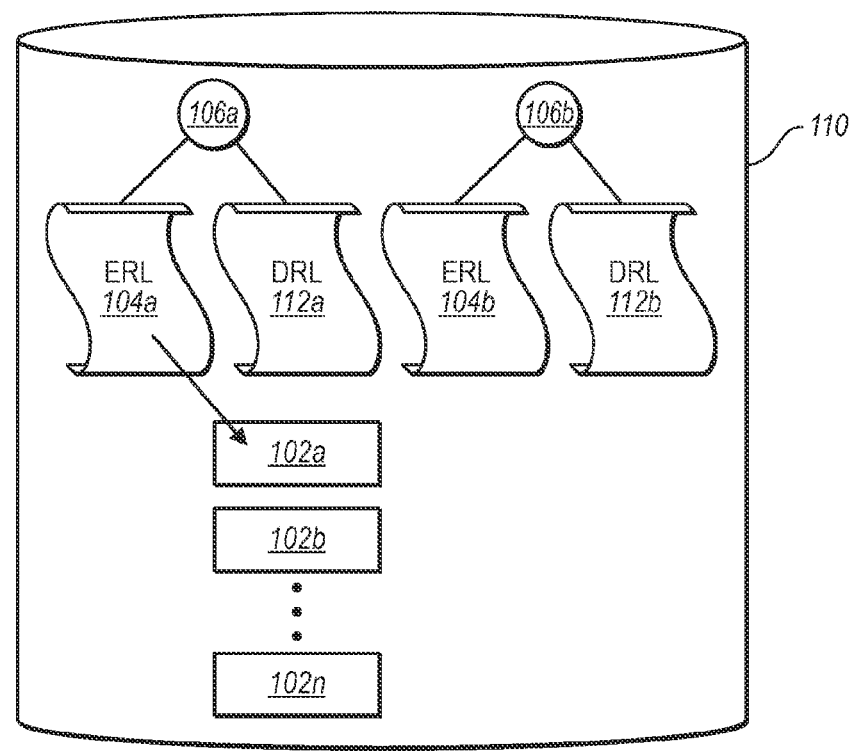
FIG. 1 illustrates a topology including a resource manager and downstream connected resource systems.
Figure 1:
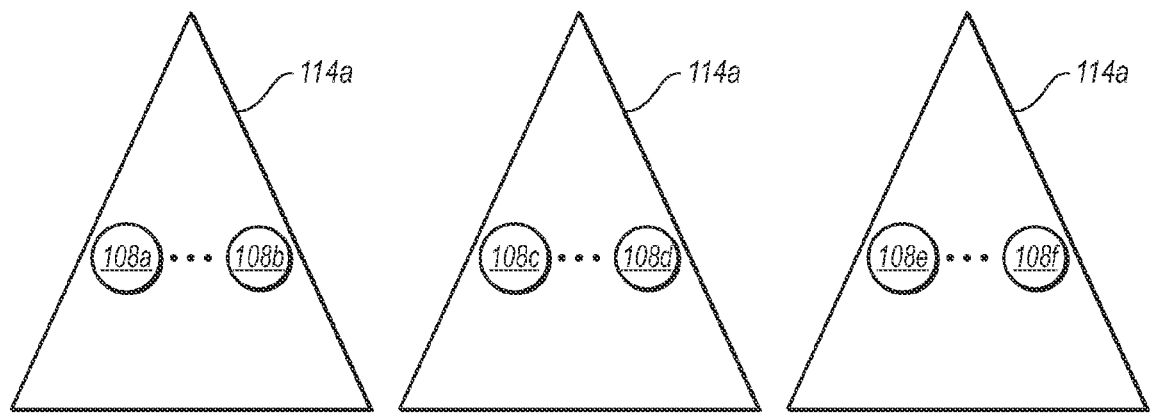

Embodiments described in herein allow for the implementation of a resource manager system that synchronizes objects in a resource manager with objects in other downstream resource systems by executing declared workflows as appropriate. In particular, using resource manager objects correlated to downstream resource system objects, appropriate permissions can be granted in the downstream resource system objects so as to grant appropriate permissions to entities corresponding to the resource manger objects and downstream resource system objects. This allows the entities to access resources in the downstream resource systems. The following discussion illustrates a number of examples of how this functionality is implemented. In particular, a resource manager can be used to control what objects exist in downstream resource systems. The existence of objects in downstream resource systems allows for the functionality of those systems to be used and appropriate controls over resources implemented. For example, if a user object exists in a downstream resource system, the user object may provide functionality for allowing a computer user to access resources on the resource system. For example, if a user is to be granted access to an email system, a user object will typically need to be created in the email system. Similarly, if a user is to be granted access to data in a data storage system, a user object for the user will need to be created in the data storage system. A resource manager can facilitate creation of these user objects in the downstream systems including the email system, the data storage system, or other resource systems.

Previously there has been no mechanism to control how data flows between two systems in a purely declarative manner. Some embodiments described herein include a unified model, based around the concept of a "synchronization rule" along with policy rules and process to replace previous models with one that provides a single set of concepts that allows, through for example, the use of visually created processes and synchronization rules, the definition of how data is to flow both into and out of a resource manager to downstream resource systems. In particular, embodiments described herein may include functionality for exporting objects at a resource manager to downstream resource systems, importing objects at downstream resource systems into a resource manger, and functionality for updating or deleting existing objects in a resource manager and corresponding objects in downstream resource systems.

A customer can use a resource manager portal, including a graphical user interface, to define synchronization rules, which encapsulate the details of how data is to flow in and out of a resource manager. The resource manager portal may include a graphical user interface including user interactive elements for receiving user input defining one or more objects, including object name and object type, managed by a resource manager, flow type for synchronizing objects managed by a resource manager with objects in one or more downstream resource systems, identification of one or more downstream resource systems, identification of object types in downstream resource systems corresponding to the one or more object types in the resource manager, and definition of relationship criteria for correlating objects in downstream resource systems with objects in the resource manager. In particular, a synchronization rule may define the relationship and transformation between a resource manager object and objects in downstream resource systems. For example, a relationship may be based on a username, email address, or other identifier. The synchronization rule may define: how the resource manager creates objects in a downstream resource system, how the resource manager creates objects in its own store, and how data flows from a downstream resource system and a resource manager object. The customer can then use policy rules and process designer wizards to control the application of those particular synchronization rules to modifications of data within the resource manager application store.

For example, embodiments may implement graphical user interface elements for a synchronization rule designer application that allow an IT profession to design synchronization rules. In one embodiment, the graphical user interface of the synchronization rule designer may be in a wizard format with "General Information," "Scope," "Relationship," "Outbound Attribute Flow," and "Inbound Attribute Flow" screens.

The "General Information" screen allows a designer to define a name for a rule, a description for a rule, dependencies for a rule, and flow type for a rule. The name is a name that can be used to identify a synchronization rule. The description is an optional description of the rule that can include any description deemed applicable by the designer. A dependency on the existence of another synchronization rule can also be set. In one embodiment, the "General Information" screen provides a pull-down menu for selecting already defined synchronization rules. As with other graphical user interface elements described herein, other interfaces may alternatively be used. The "General Information" screen may also include an interface for selection of flow type. For example, a user can define the rule as an inbound rule allowing for importing of data into the resource manager and/or an outbound rule allowing for exporting of data to a downstream system.

The synchronization rule designer application may further include a "Scope" screen. The "Scope" screen, in the example embodiment may allow for selecting a resource manager object type, selecting a downstream resource system, selecting a downstream system object type, and/or defining connected object scope. Defining connected object scope may be performed by defining one or more filters that identifies to which objects in a downstream resource system a synchronization rule will be applied. In one embodiment, the synchronization rule applies to objects in the downstream resource system which match all conditions defined in the connected object scope.

The synchronization rule designer application may further include a "Relationship" screen. The "Relationship" screen includes user interface elements for defining how a relationship between a resource manager and a downstream resource system are identified and created. In particular, the "Relationship" screen allows for defining relationship criteria and relationship creation. User interface elements allowing for the specification of relationship criteria allow for specifying conditions that link together objects in the resource manager and in the downstream resource system. Various attributes may be selected, such as email addresses, usernames, etc. Additionally, various conditions may be specified. The "Relationship" screen may also allow for specifying that an object can be created if relationship criteria specified in the defined relationship criteria are not satisfied. A user can specify that an object is created in the resource manager if absent from the resource manager, an object is created in a downstream resource system if absent from a downstream resource system, that an object hierarchy is created in a downstream resource system and/or that an object is are deleted from a downstream resource system when an object is removed from the resource manager.

The synchronization rule designer application may further include an "Outbound Attribute Flow" screen. The "Outbound Attribute Flow" screen includes user interface elements for defining attributes and values to flow from the resource manager to the downstream resource system. The "Outbound Attribute Flow" user interface elements allow for the definition of a source field, to identify the data to flow from the resource manager to an attribute in the downstream resource system; the destination, to identify the attribute in the downstream resource system to receive data identified in the source field; and options. For example, a user may specify an option whereby an attribute only flows when the destination object is created. Further, a user may select an option to specify that the attribute is used to flow to test the presence of a synchronization rule on a destination object. The synchronization rule designer application may further include an "Inbound Attribute Flow" screen. The "Inbound Attribute Flow" screen includes similar user interface elements to the "Outbound Attribute Flow" screen except that flow is defined from downstream resource systems to the resource manager.

A business manager designer application provides a graphical user interface that allows a business manger to add or remove synchronization rules to or from resource manager objects. Adding or removing may be performed by manual selection or be selected to be performed automatically based on attribute values.

A canonical scenario includes the provisioning of new users through a resource manager into downstream systems such as various email systems, database systems, or other systems. Provisioning may include, for example, adding permissions for a new employee to appropriate system resources to allow the employee to perform necessary work functions. FIG. 1 will now be used to illustrate an example. Note that in FIG. 1, various components may be described generically or specifically. For example, a generic reference to a resource manager object 106 refers to any and all resource manager objects generically while specific references to resource manager object instances may be made by reference to an additional parenthetical designator such as resource manager 106a. Similar references and designations are illustrated in FIG. 1 for synchronization rules 102, expected rules lists 104, downstream resource system objects 108, and detected rules lists (DRLs) 112. Also note that although not discussed specifically, some specific representations, such as 102b, 104b 106b, 112b, 108b-108f, 114b and 114c are included to illustrates that multiple specific instances of an item may be included in a computing environment. However, the remaining principles can be understood by reference to the single instances referred to below.

Illustrating now an example, in the case of provisioning, and referring once again to FIG. 1, synchronization rules 102 can be defined and included in expected rules lists (ERLs) 104 at the resource manager 110 that encapsulate how to transform what is created as resource manager object type into downstream resource system objects. The synchronization rules can be defined in some embodiments by using the graphical user interface as described above. Notably, synchronization rules 102 may be included explicitly in the expected rules list 104 or may be defined separate from the expected rules lists 104 and included by reference in the expected rules lists 104 as appropriate. Illustrating now an example, the synchronization rule 102a may indicate how to transform resource manager object 106a, when created or modified, to a corresponding downstream resource object 108a at the downstream resource system 114a. A synchronization rule 102 may define both how data is to flow from the resource manager 110 to the downstream resource system object 108, as well as specific instructions on how to find an already existing downstream resource system object 108 to flow data to as well as further instructions on how, if desired, to create a new downstream resource system user object 108 if a suitable one is not found.

Once a synchronization rule 102 is defined, a customer can then define a policy rule around the creation of new resource manager objects 106 in the resource manager 110 as they arrive through its resource management service. From here, the customer can construct a resource manager process, associated to the action phase of an event that will add the newly created resource manager object 106 to the synchronization rule 102 defined previously. The ultimate result being that when a new resource manager object 106 is created in the resource manager 110, an event will be generated that causes this action process to run and signal that this newly created resource manager object 106 is to have the synchronization rule 102 applied to it.

Using these constructs, a user can create arbitrarily complex processes, such as in the form or declarative workflows, which add and remove objects in the resource manager 110 to synchronization rules 102 as needed and dictated by their own business process.

The termination or de-provisioning scenario in which a user is leaving the company can be handled in a similar manner as the creation scenario, just that a process will be defined to run on the event of a resource manager object 106 being deleted from the resource manager system and that process will remove that deleted resource manager object 106 from the synchronization rule 102. Note that declarative workflows differ from imperative programming in the declarative objects in declarative workflows define an end goal without defining specific acts to accomplish the goal. In contrast, imperative programming requires a programmer to define explicitly each step without necessarily defining the end goal.

Embodiments described herein may include definitions of bidirectional data flow logic within the concept of a synchronization rule 102. Further embodiments may include the application of synchronization rules 102 by virtue of matching of a policy rule and execution of a subsequent resource manager process.

Embodiments may be directed to both processing of synchronization rules by a synchronization engine, as well as the rules application to relevant resource manager objects 106 done through the resource manager request processing cycle (which, in one embodiment, processes end user web service requests through three distinct phases: authentication, authorization and action).

Within the single structure of synchronization rules, a customer defines both the relationship between an object in a downstream resource system and one in a resource manager metaverse as well as the flow of data between the two. In previous versions of resource managers, this single structure did not exist, but rather a user would have to define the inbound flow of data through a single set of concepts (Join/Projection/Inbound Flow) that were independent from those which governed the flow of data outbound from the resource manager (Programmed logic+Outbound flow). In some embodiments, the synchronization rule defines a new set of concepts which is meant to treat both directions of flow the same, while at the same time eliminating the need for any programming as part of this structure.

Synchronization rules are run both when importing changes from a downstream resource system into the resource manager ('inbound'), as well as when exporting changes from the resource manager to a downstream resource system ('outbound').

In any direction, a synchronization rule may operate by scoping the appropriate set of objects, then looking for or establishing a relationship with an object in the other system, and then applying the transformation specified as part of the rule between the source object and the target object found as part of the relationship.

When looking at the direction of flow being from a downstream resource system to the resource manager, scoping may be achieved through a straight attribute-value filter which is used to collect the necessary set of objects in the downstream resource system upon which a synchronization rule should be applied to on import.

However, when looking at synchronization from the resource manager perspective, set memberships, policy rules and process may be the dictators of which objects are brought in and out of scope of a synchronization rule rather than a straight filter as is used on the inbound case. Specifically, when looking at the resource manager, there may be no automatic filter which collects users within the scope of a rule, instead each resource manager object has associated a list of synchronization rules to which the resource manager object should be applied. This list is referred to herein as the expected rules list 104. When a synchronization rule appears on a resource manager object's expected rules list 104, that resource manager object is then manually added to the scope of the associated synchronization rule upon the next run of the synchronization engine. It is expected that synchronization rules are added and removed from a resource manager object's expected rules 104 list through action processes in a declarative workflow which use the synchronization rule activity to manipulate the expected rules list. These action workflows may be expected to launch as a result of normal resource manager operations on its objects.

Additionally, each resource manager object 106 also has an associated list which visualizes what synchronization rules are confirmed to exist on that resource manager object in the real world, this list is called the detected rules list 112. The detected rules list 112 and expected rules list 104 may be completely independent of each other and are only applicable from a resource manager centric view. That is, the expected rules list 104 is used for outbound synchronization and the detected rules list 112 is used for looking at a resource manager object's representation in downstream systems. In FIG. 1, 108*a* is a downstream representation of 106*a*.

A detected rules list 112 may be created by identifying objects in connected downstream systems 114 and correlating the objects with objects in the resource manager 110. Resource manager objects 106 can be created in the resource manager 110 as necessary to account for objects 108 discovered in downstream resource systems. Often downstream resource systems 114 may include objects 108 granting permissions to entities of which the resource manager 110 is not aware. Creation of a detected rules list 112 provides functionality for identifying these objects 108 in downstream systems 114. The expected rules list 104 can then be updated to either note the objects 108 in the downstream systems 114 or to remove permissions, by removing downstream resource system objects 108 from the downstream systems 114 or to remove permission from the downstream system objects 108.

The expected rules list 104 and detected rules list 112 constructs allow for a user to both look at what a representation of resource manager object 106 is supposed to look like in downstream systems 114 as a downstream resource system object 108, as well as confirm what that representation actually is. The detected rules list 112 proves especially useful for compliance reporting, in that a single attribute will display the known representation of that particular resource manager object 106 as it is known to correspond to downstream resource system objects 108 in other systems.

As mentioned above, if the synchronization rule is being evaluated in the inbound direction, the scoping of an object may be done via the filter. If it is being evaluated in the outbound leg, each object's expected rules list 104 may used to determine which objects fall into the scope of the synchronization rule 102.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed.

Figure 2:
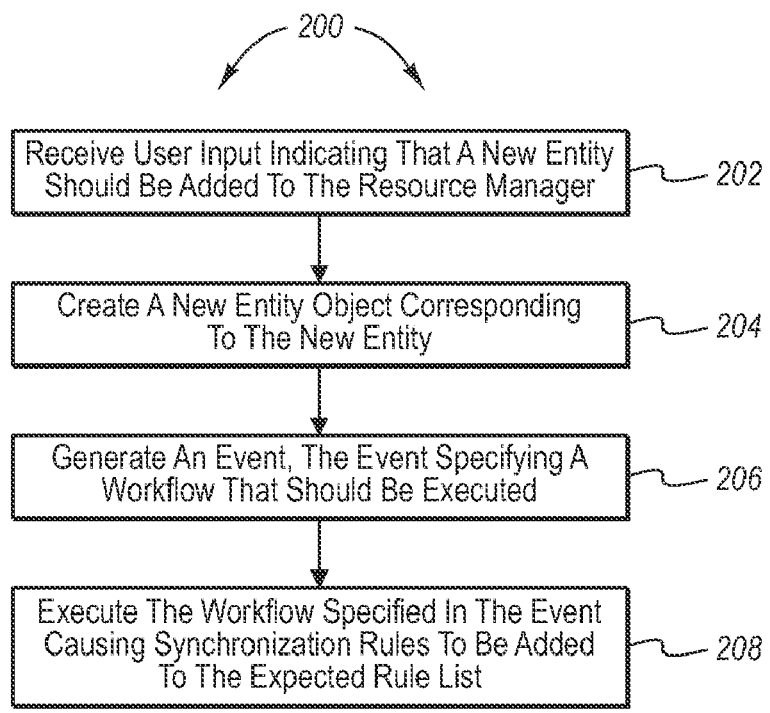
FIG. 2 illustrates a method of creating objects in downstream resource systems.

Referring now to FIG. 2, a method 200 is illustrated. The method 200 may be practiced for example in a computing environment including a resource manager. The resource manager includes programmatic code for managing resources. The method 200 includes an act of receiving user input indicating that a new entity should be added to the resource manager (act 202). For example, in the example illustrated in FIG. 1, a user may desire to add a new object such as resource manager object 106*a* to the resource manager 110. A user may indicate, using a user interface coupled to the resource manager 110, the desire to add the resource manager object 106*a*.

In response to receiving user input indicating that a new entity should be added to the resource manager, the method 200 further includes creating a new entity object corresponding to the new entity (act 204) and generating an event (act 206). For example, a resource manager object 106*a* may be added to the resource manager repository and an event may be generated. The event may specify a workflow that should be executed. The workflow is configured to add synchronization rules 102 to an expected rules list 104*a* particular to the new entity object. For example, a workflow may be configured to add the synchronization rule 102*a* to the expected rules list 104*a*. Synchronization rules 102 on the expected rules list define how to transform objects 106 at the resource manager 110 into objects 108 at downstream resource systems 114. In particular, synchronization rules 102 may define how one or more entity objects 108 are created in a downstream resource system 114, how one or more entity objects 106 are created at the resource manager 110 and how data flows from a downstream resource system 114 to a resource manager object 106. Additionally, synchronization 102 rules may define within a single synchronization rule 102, one or more of an inbound, outbound, or bi-directional relationship between a downstream resource system 114 and the resource manager 110.

The method 200 further illustrates that in response to the event, the workflow specified in the event is executed causing synchronization rules to be added to the expected rules list (act 208). As illustrated in FIG. 1, the synchronization rule 102*a* is added to the expected rules list 104*a*. Notably, adding synchronization rules to an expected rules list may be performed in a number of different fashions. For example, a synchronization rule 102*a* may be stored in a rule repository at the resource manager 110. The synchronization rule 102*a* may be added to the expected rules list 104*a* by reference to a synchronization rule in the rule repository. Alternatively, a rule may be added to the expected rules list explicitly by direct definition in the expected rules list 104*a*. In other words, an expected rules list 104 may serve as the repository for synchronization rules 102 in the expected rules list 104.

The method 200 may further be practiced such that at a synchronization engine of the resource manager, a workflow is executed to synchronize the new entity object with corresponding objects in downstream resource systems managed by the resource manager so as to cause the creation of permissions for the new entity in the downstream resource systems by executing the synchronization rules in the expected rules list. For example, the synchronization engine may reference the synchronization rule 102*a* in the expected rules list 104*a*. The synchronization engine may determine that the resource manager object 106*a* should be synchronized with the downstream resource system object 108*a* at the downstream resource system 114*a*. As will be described in more detail below, this may be accomplished by correlation of an existing downstream resource system object 108 with a resource manager object 106 or by creation of a new downstream resource system object 108 to correspond with the resource manager object 106.

For example, the method 200 may be performed where causing the creation of permissions for the new entity in the downstream resource systems includes determining that an object corresponding to the new entity object does not exist in the downstream resource system; and creating an object in the downstream resource system corresponding to the new entity object at the resource manager. In the example illustrated in FIG. 1, the downstream resource system object 108a may not exist in the downstream resource system 114a when the synchronization engine executes a workflow to synchronize the synchronization rule 102a to synchronize the resource manager object 106a with the downstream resource system object 108a. Thus, embodiments may include creating the downstream resource system object 108a in the downstream resource system 114a. This allows for further synchronization in granting of appropriate rights and permissions.

In one embodiment the method 200 may be practiced where executing a workflow to synchronize the new entity object with corresponding objects in downstream resource systems managed by the resource manager includes executing synchronization rules according to precedence specified for the synchronization rules. The precedence specifies synchronization rules that should be executed before other synchronization rules. For example, the expected rules list 104a may include a number of synchronization rules including rules 102a through 102n. However, it may be desirable to perform the synchronization specified in some synchronization rules 102 before the synchronization specified in other rules. This may be done for example to ensure that permissions or restrictions specified in one rule are not overwritten by the later application of a different synchronization rule.

Figure 3:
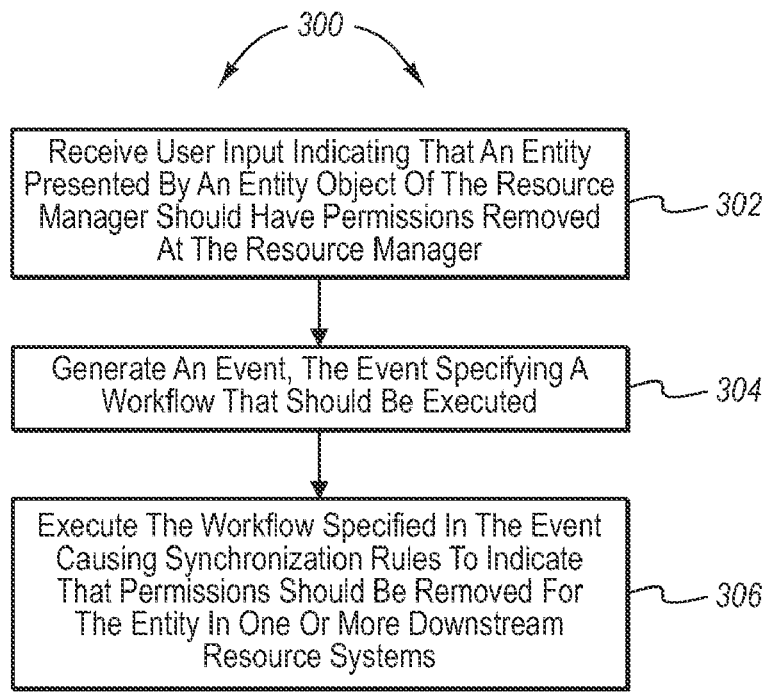
FIG. 3 illustrates a method of removing permissions from objects in downstream resource systems.

Referring now to FIG. 3, a method 300 is illustrated. The method 300 illustrates the number of acts that may be performed in a computing environment including a resource manager. The resource manager includes programmatic code for managing resources in the computing environment. The method 300 includes acts for managing resources including managing permissions for entities to access the resources. The method includes receiving user input indicating that an entity represented by an entity object of the resource manager should have permissions removed at the resource manager (act 302). For example, a user interacting with a user interface connected to the resource manager 110 may indicate that an entity corresponding to a resource manager object 106a should have permissions removed from downstream resource systems 114. For example, if the entity is an employee at an organization and the role of the entity is changed, it may be necessary to remove certain permissions from a certain downstream resource systems 114 such that the entity can no longer access, or perform certain access actions at resources at the downstream resource systems 114. Such may be indicated by an administrator interacting with the resource manager 110.

In response to receiving user input that an entity should have permissions removed at the resource manager, an event is generated (act 304). The event specifies a workflow that should be executed. The workflow is configured to cause synchronization rules in an expected rules list particular to the entity object to indicate that permissions should be removed for the entity in one or more downstream resource systems. For example, a synchronization rule 102a may be modified to indicate that permissions should be removed from a downstream resource system object 108a.

The method 300 may further include in response to the event, executing the workflow specified in the event (act 306) causing synchronization rules to indicate that permissions should be removed for the entity in one or more downstream resource systems.

The method 300 may further include, at a synchronization engine of the resource manager, executing a workflow to synchronize the entity object with corresponding objects in downstream resource systems managed by the resource manager so as to cause the removal of permissions for the entity in the downstream resource systems. For example a workflow may be configured to reference the synchronization rule 102a and to synchronize a resource manager object 106a with a downstream resource system object 108a where such synchronization results in the removal of permissions for the downstream resource system object 108a.

In one embodiment, the method 300 may be practiced where causing synchronization rules in an expected rules list particular to the entity object to indicate that permissions should be removed for the entity in downstream resource systems includes adding new synchronization rules to the expected rules list. For example, a new synchronization rule 102 may be added to an expected rules list 104 indicating that permissions should be removed.

In one embodiment, the method 300 may further include generating a detected rules list, where the detected rules list specifies existing permissions for the entity object for resources in an the computing environment. Generating a detected rules list includes examining objects in downstream resource systems and correlating the examined objects in downstream resource systems with resource manager objects managed by the resource manager. Executing the workflow specified in the event causing synchronization rules to be removed from the expected rules list (act 306) includes causing a workflow to be executed that causes existing permission from the detected rules list to be removed from the expected rules list.

For example, as has been discussed above and as will be discussed in more detail below the detected rules list 112a may determine that a downstream resource system object 108a includes certain permissions that are undesirable to be granted to an entity corresponding to the downstream resource system object 108a. To remove these permissions, the synchronization rule 102 may be added to the expected rules list 104a which specifically removes the permissions from the downstream resource system object 108a.

In an alternative embodiment, causing synchronization rules in an expected rules list particular to the entity object to indicate that permissions should be removed for the entity in downstream resource systems may include modifying existing synchronization rules in the expected rules list. For example, if the synchronization rule 102a is included on the expected rules list 104a and grants certain permissions to the downstream resource system object 108a, removal of the permissions may be accomplished by modifying the synchronization rule 102a.

FIG. 4 illustrates yet another embodiment that may be practiced in a computing environment including a resource manager. The resource manager includes programmatic code for managing resources in the computing environment. The method of managing resources includes managing permissions for entities to access the resources. The method 400 includes receiving user input indicating that an entity represented by an entity object of the resource manager should have permissions added at the resource manager (act 402). For example, a resource manager object 106a corresponding to an entity may exist in the resource manager 110. An administrator interacting with the resource manager 110 may provide user input indicating that additional permissions should be added in downstream resource systems 114 for the resource manager object 106a.

The method 400 further illustrates that in response to receiving user input that an entity should have permissions added at the resource manager, an event is generated (act 404). The event specifies a workflow that should be executed. The workflow is configured to cause synchronization rules in an expected rules list particular to the entity object to indicate that permissions should be added for the entity in one or more downstream resource systems. As illustrated in previous examples, a synchronization rule 102a may be added to an expected rules list 104a, or modified if the appropriate synchronization rule 102a already exists in the expected rules list 104a, to allow for an event to indicate that permissions should be added to a downstream resource system object 108a.

The method 400 further includes in response to the event, executing the workflow specified in the event causing synchronization rules to indicate that permissions should be added for the entity in one or more downstream resource systems (act 406).

The method 400 may further include at a synchronization engine of the resource manager, executing a workflow to synchronize the entity object with corresponding objects in downstream resource systems managed by the resource manager so as to cause the creation of permissions for the new entity in the downstream resource systems by executing the synchronization rules in the expected rules list. For example, a workflow may be configured to reference the synchronization rule 102a in the expected rules list 104a so as to synchronize and/or otherwise create permissions in the downstream resource system object 108a.

As noted previously, several embodiments make use of a detected rules list where the detected rules list defines an actual state of permissions in downstream resource systems for an entity. Thus, some embodiments may be directed to generating the detected rules list and making appropriate use of the detected rules list. For example, the method 500 may be practiced In a computing environment including a resource manager, the resource manager comprising programmatic code for managing resources in the computing environment, the method 500 includes generating a detected rules list (act 502). The detected rules list specifies existing permissions for an entity for resources in a computing system. Generating a detected rules list includes examining objects in downstream resource systems and correlating the examined objects in downstream resource systems with resource manager objects managed by the resource manager.

The method 500 further includes accessing an expected rules list (act 504). The expected rules list defines permissions that should exist for the entity for resources in the computing system. For example, an expected rules list may define how synchronization should be performed between a resource manager object 102 and a corresponding downstream resource system object 108. Permissions can be inferred or determined from the rules in the expected rules list 104.

The method 500 further includes comparing the detected rules list to the expected rules list and determining that the detected rules list includes permissions not included in the expected rules list (act 506). For example, the detected rules list 104a may be compared to the detected rules list 112a. Based on the comparison, a determination may be made that the detected rules list 112a includes permissions for an entity that are not included in the expected rules list 104a.

An indication can be provided that the detected rules list includes permissions not included in the expected rules list (act 508).

The method 500 may further include receiving user input indicating the permissions included in the detected rules list and not included in the expected rules list should be removed. This embodiment further includes in response to the user input, removing the permissions included in the detected rules list and not included in the expected rules list by modifying the expected rules list and executing a workflow. The workflow is configured to cause the removal of permissions in downstream resource systems. In one embodiment, modifying the expected rules list includes including an entry in the expected rules list indicating removal of one or more permissions.

In one embodiment of the method 500, correlating the examined objects in downstream resource systems with objects managed by the resource manager includes determining that an object does not exist in the resource manager that can be correlated with an object in the downstream resource system. An object is created in the resource manager to correlate with the object in the downstream resource system.

The method 500 may be practiced where the expected rules list includes one or more synchronization rules. Each of the one or more synchronization rules may include a number of parameters. For example, each of the one or more synchronization rules may include an indicator used to identify the synchronization rule. Each of the one or more synchronization rules may include, a definition of flow type specifying that the synchronization rule can be used for at least one of importing data into a the resource manager from a downstream resource system or exporting data from the resources manager to a downstream resource system. Each of the one or more synchronization rules may include specification of an object type in the resource manager that the synchronization rule applies to. Each of the one or more synchronization rules may include specification of a downstream resource system. Each of the one or more synchronization rules may include specification of an object type in the downstream resource system to which the synchronization rule applies. Each of the one or more synchronization rules may include specification of relationship criteria including one or more conditions for linking objects in the resource manager and the downstream resource system.

Embodiments may be implemented where each of the one or more synchronization rules may optionally include specification of attribute flow information. Each of the one or more synchronization rules may optionally include a description of the synchronization rule. Each of the one or more synchronization rules may optionally include information defining a dependency on the existence of another synchronization rule. Each of the one or more synchronization rules may optionally include a filter used for identifying objects in the downstream resource system to which the synchronization rule will be applied. The filter may include conditions that must be satisfied to apply the synchronization rule.

Each of the one or more synchronization rules may optionally include specification of relationship creation acts that can be used when the relationship criteria specified in the relationship criteria is not satisfied. For example, the relationship creation acts may include creation of an object in the resource manager if absent from the resource manager. Alternatively or additionally, relationship creation acts may include creation of an object in a downstream resource system if absent from the downstream resource system. Alternatively or additionally, relationship creation acts may include creation of an object hierarchy in a downstream resource system. Alternatively or additionally, relationship creation acts may include deletion of an object from a downstream resource system when a corresponding object is removed from the resource manager.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a resource manager and a plurality of downstream resource systems, the resource manager comprising programmatic code for managing resources in the computing environment, a method of managing resources available from the plurality of resource systems within the computing environment, including managing permissions for entities to access the resources, the method comprising:
   receiving user input indicating that a new entity should be added to the resource manager;
   in response to receiving user input indicating that a new entity should be added to the resource manager:
      creating a new entity object at the resource manager, the new entity object corresponding to the new entity; and
      generating an event, the event specifying a workflow that should be executed in connection with creation of the new entity object, wherein the workflow is configured to add one or more synchronization rules to an expected rules list that is particular to the new entity object, wherein the one or more synchronization rules on the expected rules list define how to transform one or more objects at the resource manager into a plurality of different objects at the downstream resource systems;
   in response to generating the event, executing the workflow specified in the event thereby causing the one or more synchronization rules to be added to the expected rules list;
   generating a detected rules list, the detected rules list specifying existing permissions for the new entity for the downstream resource systems, wherein generating the detected rules list comprises examining one or more of the plurality of different objects in the downstream resource systems and correlating the examined objects in the downstream resource systems with entity objects managed by the resource manager;
   comparing the detected rules list with the expected rules list, and determining that the detected rules list indicates that at least one of the plurality of different objects in the downstream resource systems includes an attribute that is not included in the one or more synchronization rules of the expected rules list; and
   based on comparing the detected rules list with the expected rules list, updating at least one synchronization rule of the expected rules list.

2. The method of claim 1, further comprising at a synchronization engine of the resource manager, executing a workflow to synchronize the new entity object with corresponding objects in the downstream resource systems managed by the resource manager so as to cause the creation of permissions for the new entity in the downstream resource systems by executing the synchronization rules in the expected rules list.

3. The method of claim 2, wherein causing the creation of permissions for the new entity in the downstream resource systems comprises:
   determining that an object corresponding to the new entity object does not exist in the downstream resource system; and
   creating an object in the downstream resource system corresponding to the new entity object at the resource manager.

4. The method of claim 2, wherein executing a workflow to synchronize the new entity object with corresponding objects in the downstream resource systems managed by the resource manager comprises executing synchronization rules according to precedence specified for the synchronization rules, wherein the precedence specifies synchronization rules that should be executed before other synchronization rules.

5. The method of claim 1, wherein at least one of the synchronization rules defines:
   how one or more entity objects are created in a downstream resource system;
   how one or more entity objects are created at the resource manager; and
   how data flows from a downstream resource system to a resource manager object.

6. The method of claim 5, wherein the at least one of the synchronization rules defines, within a single synchronization rule, one or more of an inbound, outbound, or bi-directional relationship between a downstream resource system and the resource manager.

7. The method of claim 1, wherein the workflow is previously defined by an administrator using a system that displays a graphical user interface comprising user interactive elements for receiving user input defining one or more objects, including:
   object name and object type, managed by a resource manager;
   flow type for synchronizing objects managed by a resource manager with objects in one or more downstream resource systems;
   identification of one or more downstream resource systems;
   identification of object types in downstream resource systems corresponding to the one or more object types in the resource manager; and
   definition of relationship criteria for correlating objects in downstream resource systems with objects in the resource manager.

8. In a computing environment including a resource manager and a plurality of downstream resource systems, the resource manager comprising programmatic code for managing resources in the computing environment, a method of managing resources including managing permissions for entities to access the resources, the method comprising:

receiving user input indicating that an entity represented by an entity object of the resource manager should have permissions removed at the resource manager;

in response to receiving user input that an entity should have permissions removed at the resource manager, generating an event, the event specifying a workflow that should be executed, wherein the workflow is configured to cause one or more synchronization rules in an expected rules list particular to the entity object to indicate that permissions should be removed for the entity in one or more downstream resource systems;

in response to generating the event, executing the workflow specified in the event, thereby causing the one or more synchronization rules to indicate that permissions should be removed for the entity in one or more objects at one or more downstream resource systems;

generating a detected rules list, the detected rules list specifying existing permissions for the entity for the downstream resource systems, wherein generating the detected rules list comprises examining the one or more objects in the downstream resource systems and correlating the examined objects in the downstream resource systems with the entity object of the resource manager;

comparing the detected rules list with the expected rules list, and determining that the detected rules list indicates that at least one of the one or more objects in the downstream resource systems includes an attribute that is not included in the one or more synchronization rules of the expected rules list; and based on comparing the detected rules list with the expected rules list, updating at least one synchronization rule of the expected rules list.

9. The method of claim 8, further comprising at a synchronization engine of the resource manager, executing a workflow to synchronize the entity object with corresponding objects in the downstream resource systems managed by the resource manager so as to cause the removal of permissions for the entity in the downstream resource systems.

10. The method of claim 8, wherein causing the one or more synchronization rules to indicate that permissions should be removed for the entity in one or more objects at one or more downstream resource systems comprises adding one or more new synchronization rules to the expected rules list.

11. The method of claim 8, wherein causing the one or more synchronization rules to indicate that permissions should be removed for the entity in one or more objects at one or more downstream resource systems comprises modifying existing one or more synchronization rules in the expected rules list.

12. A computer system, comprising:
one or more processors; and
one or more computer-readable storage media storing computer-executable instructions that, when executed by the one or more processors, cause the computer system to implement a method of managing resources including managing permissions for entities to access the resources, the method comprising:

receiving user input indicating that an entity represented by an entity object of the resource manager should have permissions added at the resource manager;

in response to receiving user input that an entity should have permissions added at the resource manager, generating an event, the event specifying a workflow that should be executed, wherein the workflow is configured to cause one or more synchronization rules in an expected rules list particular to the entity object to indicate that permissions should be added for the entity in one or more downstream resource systems;

in response to generating the event executing the workflow specified in the event, thereby causing the one or more synchronization rules in the expected rules list to indicate that permissions should be added for the entity in one or more objects at one or more downstream resource systems;

generating a detected rules list, the detected rules list specifying existing permissions for the entity for the downstream resource systems, wherein generating the detected rules list comprises examining the one or more objects in the downstream resource systems and correlating the examined objects in the downstream resource systems with the entity object of the resource manager;

comparing the detected rules list with the expected rules list, and determining that the detected rules list indicates that at least one of the one or more objects in the downstream resource systems includes an attribute that is not included in the one or more synchronization rules of the expected rules list; and based on comparing the detected rules list with the expected rules list, updating at least one synchronization rule of the expected rules list.

13. The computer system of claim 12, further comprising at a synchronization engine of the resource manager, executing a workflow to synchronize the entity object with corresponding objects in the downstream resource systems managed by the resource manager so as to cause the creation of permissions for the new entity in the downstream resource systems by executing the synchronization rules in the expected rules list.

14. The computer system of claim 12, further comprising:
determining that an object already exists in the one or more downstream resources systems granting the permissions; and
associating the entity object with the object that already exists in the one or more downstream resource systems in a synchronization rule.

15. The computer system of claim 12, wherein at least one of the one or more synchronization rules further comprises a description of the synchronization rule.

16. The computer system of claim 12, wherein at least one of the one or more synchronization rules comprises information defining a dependency on the existence of another synchronization rule.

17. The computer system of claim 12, wherein at least one of the one or more synchronization rules further comprises a filter used for identifying objects in the downstream resource system to which the synchronization rule will be applied.

18. The computer system of claim 12, wherein the filter comprises conditions that must be satisfied to apply the synchronization rule.

19. The computer system of claim 12, wherein at least one of the one or more synchronization rules further comprises specification of relationship creation acts that can be used when the relationship criteria specified in the relationship criteria is not satisfied, wherein the relationship creation acts comprise one or more of:

creation of an object in the resource manager if absent from the resource manager;

creation of an object in a downstream resource system if absent from the downstream resource system;

creation of an object hierarchy in a downstream resource system; or deletion of an object from a downstream resource system when a corresponding object is removed from the resource manager.

20. The computer system of claim 12, wherein each synchronization rule in the expected rules list comprises:

an indicator used to identify the synchronization rule;

a definition of flow type specifying that the synchronization rule can be used for at least one of importing data into a the resource manager from a downstream resource system or exporting data from the resources manager to a downstream resource system;

specification of an object type in the resource manager that the synchronization rule applies to;

specification of a downstream resource system;

specification of an object type in the downstream resource system to which the synchronization rule applies;

specification of relationship criteria including one or more conditions for linking objects in the resource manager and the downstream resource system; and specification of attribute flow information.

* * * * *